(12) United States Patent
Kleverman et al.

(10) Patent No.: US 7,796,234 B2
(45) Date of Patent: Sep. 14, 2010

(54) LOW LOSS TRANSFLECTIVE DEVICE DISPLAY COMPRISING A LIGHT GUIDE INCLUDING OPTICAL FIBERS

(75) Inventors: Mats Kleverman, Helsingborg (SE); Gunnar Klinghult, Lund (SE); Mats Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 149 days.

(21) Appl. No.: 11/738,811

(22) Filed: Apr. 23, 2007

(65) Prior Publication Data

US 2008/0259250 A1    Oct. 23, 2008

(51) Int. Cl.
  *G02F 1/1333* (2006.01)
  *G02F 1/1335* (2006.01)
(52) U.S. Cl. .......... 349/159; 349/114; 349/62; 349/63; 349/65; 349/67
(58) Field of Classification Search ........ 349/159, 349/62, 64, 65; 385/120; 362/97.1, 97.2
  See application file for complete search history.

(56) References Cited

U.S. PATENT DOCUMENTS

| 3,582,297 | A | * | 6/1971 | Lakeman | 65/400 |
| 5,818,554 | A | | 10/1998 | Hiyama et al. | |
| 6,335,778 | B1 | * | 1/2002 | Kubota et al. | 349/151 |
| 6,487,351 | B1 | * | 11/2002 | Cryan et al. | 385/120 |
| 7,110,062 | B1 | | 9/2006 | Whitted et al. | |
| 2001/0019383 | A1 | * | 9/2001 | Shin et al. | 349/106 |
| 2002/0034370 | A1 | * | 3/2002 | Yook et al. | 385/139 |
| 2003/0058390 | A1 | | 3/2003 | Fujii | |
| 2004/0061827 | A1 | * | 4/2004 | Park et al. | 349/201 |
| 2005/0082464 | A1 | * | 4/2005 | Krantz et al. | 250/216 |
| 2005/0140872 | A1 | | 6/2005 | Kang | |
| 2005/0219446 | A1 | * | 10/2005 | Hisatake | 349/114 |
| 2005/0284183 | A1 | * | 12/2005 | Sigel et al. | 65/390 |
| 2007/0008738 | A1 | | 1/2007 | Han et al. | |
| 2008/0123033 | A1 | * | 5/2008 | Grip et al. | 349/114 |

FOREIGN PATENT DOCUMENTS

| EP | 0 867 749 A2 | 9/1998 |
| JP | 6-337410 | 12/1994 |
| JP | 9-184922 | 7/1997 |
| JP | 2004-37831 | 2/2004 |

OTHER PUBLICATIONS

International Search Report and Written Opinion dated Apr. 17, 2008 issued in corresponding PCT application No. PCT/IB2007/054287, 13 pages.

* cited by examiner

*Primary Examiner*—Andrew Schechter
*Assistant Examiner*—Michael Inadomi
(74) *Attorney, Agent, or Firm*—Harrity & Harrity, LLP (57) ABSTRACT

A device display includes a light guide with an optical fiber embedded in an optically transparent material, a pixel array that has a pixel aligned with a first end of the optical fiber, and a reflective mechanism provided at a second end of the optical fiber. The reflective mechanism is capable of reflecting light, received by the pixel, back to the pixel via the optical fiber.

10 Claims, 12 Drawing Sheets

LOW LOSS TRANSFLECTIVE DEVICE DISPLAY COMPRISING A LIGHT GUIDE INCLUDING OPTICAL FIBERS

BACKGROUND

Displays for devices may include transmissive, reflective, or transflective displays. A transmissive display is illuminated from the back by an illumination device/light guide (e.g., a backlight), and is viewed from the opposite side (i.e., the front). This type of display may be used in applications requiring high luminance levels (e.g., computer displays, televisions, personal digital assistants (PDAs), mobile phones, etc.). A reflective display (e.g., often found in digital watches or calculators) is illuminated by external (e.g., ambient) light reflected by a diffusing reflector located behind the display.

A transflective display works in two modes, a transmissive mode or a reflective mode, depending on the ambient light. For example, a transflective display operates in the transmissive mode in darker environments (e.g., lower ambient light conditions, such as indoors) via a light guide, and in the reflective mode when ambient light levels are high (e.g., outdoors). In the transmissive mode, light from the light guide is directed (e.g., from a backside) through various layers of a pixel array of the display. In the reflective mode, ambient light enters from the front side of the pixel array, travels through the layers of the pixel array, and is reflected back through the pixel array by a reflective material (e.g., a reflective film) positioned on a front side of the light guide. However, the reflective material also reduces the intensity of the light guide (i.e., high reflectivity implies low transmissivity and vice versa). In order to achieve an adequate intensity in the transmissive modem, a higher intensity light is needed from the light guide (which consumes more power) than if the reflective material was absent.

One solution to this problem may be to move the reflective material to the backside of the light guide. However, with such an arrangement, the distance between the reflective material and the pixel array becomes so large that issues appear during the reflective mode. For example, because of the large distance between the reflective material and the pixel array, incoming and reflected ambient light travel through different pixels of the pixel array. Thus, the image information of different pixels becomes mixed, resulting in a distorted display image.

SUMMARY

According to one aspect, a device display may include a light guide that includes an optical fiber embedded in an optically transparent material, a pixel array that includes a pixel aligned with a first end of the optical fiber, and a reflective mechanism provided at a second end of the optical fiber. The reflective mechanism may be capable of reflecting light, received by the pixel, back to the pixel via the optical fiber.

Additionally, the reflective mechanism may include a reflective film provided on a side of the light guide opposing a side of the light guide facing the pixel array.

Additionally, the reflective film may include at least one of a metal-based material capable of reflecting light, a white reflector material, or a silver reflector material.

Additionally, the reflective mechanism may include a retro-reflective shape formed at the second end of the optical fiber.

Additionally, the retro-reflective shape may include at least one of a cone or a prism.

Additionally, the reflective mechanism may include a reflective material formed at the second end of the optical fiber.

Additionally, the reflective material may include at least one of a metal-based material capable of reflecting light, a white reflector material, or a silver reflector material.

Additionally, an index of refraction of the optical fiber may be higher than an index of refraction of the optically transparent material.

Additionally, the optically transparent material may include at least one of glass, quartz, sapphire, polymeric, or plastic materials.

Additionally, the optical fiber may include at least one of glass or plastic materials.

Additionally, the optical fiber may include a bundle of optical fibers.

Additionally, the optical fiber may include at least one of a circular, a square, a rectangular, an elliptical, a triangular, or a polygonal cross section.

Additionally, the pixel array may include at least one of a monochrome or a color pixel array.

Additionally, the pixel array may include a liquid crystal display (LCD).

Additionally, the pixel of the pixel array may include a first thin film transistor (TFT) associated with a first subpixel, a second TFT associated with a second subpixel, and a third TFT associated with a third subpixel.

According to another aspect, a device display may include a pixel array that includes a pixel associated with one or more retro-reflective shapes provided on a side of the pixel array facing the light guide. The one or more retro-reflective shapes may be capable of reflecting light, received by the pixel, back to the pixel.

Additionally, the light guide may include at least one of glass, quartz, sapphire, polymeric, or plastic materials.

Additionally, the pixel array may include at least one of a monochrome or a color pixel array.

Additionally, the pixel array may include a liquid crystal display (LCD).

Additionally, the one or more retro-reflective shapes may include at least one of a cone or a prism.

According to yet another aspect, a method may include providing a light guide for a device display that includes a pixel array with a pixel, the light guide including an optical fiber embedded in an optically transparent material, aligning a first end of the optical fiber with the pixel of the pixel array, and providing a reflective mechanism at a second end of the optical fiber. The reflective mechanism may be capable of reflecting light, received by the pixel, back to the pixel via the optical fiber.

Additionally, providing a reflective mechanism may include providing a reflective film on a side of the light guide opposing a side of the light guide facing the pixel array.

Additionally, providing a reflective mechanism may include providing a retro-reflective geometric shape at the second end of the optical fiber.

Additionally, providing a reflective mechanism may include providing a reflective material at the second end of the optical fiber.

According to still another aspect, a method may include providing, for a device display, a pixel array that includes a pixel, and forming one or more retro-reflective geometric shapes, aligned with the pixel, on a side of the pixel array. The one or more retro-reflective geometric shapes may be capable of reflecting light, received by the pixel, back to the pixel.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

OVERVIEW

Implementations described herein may relate to systems and methods for providing a low loss transflective device display. For example, in one implementation, a device display may include a light guide, a reflective material provided on one side of the light guide, and a pixel array that includes multiple pixels. The light guide of a device display may include optical fibers provided in an optically transparent material. Each optical fiber may optically communicate with a corresponding pixel of the pixel array. In another implementation, the reflective material may be removed from the display, and the optical fibers of the light guide may include reflective portions and/or retro-reflective geometric shapes on their ends. In still another implementation, the reflecting material may be removed from the display, and the light guide may include an optically transmissive material. A surface of the pixel array facing the light guide may include retro-reflective geometric shapes. Such arrangements may help ensure that ambient light is provided to and reflected through the same pixel of the device's pixel array, which may help prevent mixing of image information from different pixels (i.e., cross-talk) and distorting of the display image.

The description to follow will describe a device. As used herein, a "device" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a Doppler receiver, and/or global positioning system (GPS) receiver; a laptop; a GPS device; a personal computer; an MP3 player; a printer; a facsimile machine; a pager; a calculator; a camera (e.g., digital or video); and/or any other device capable of utilizing a display.

EXEMPLARY DEVICE DISPLAYS

Figure 1:
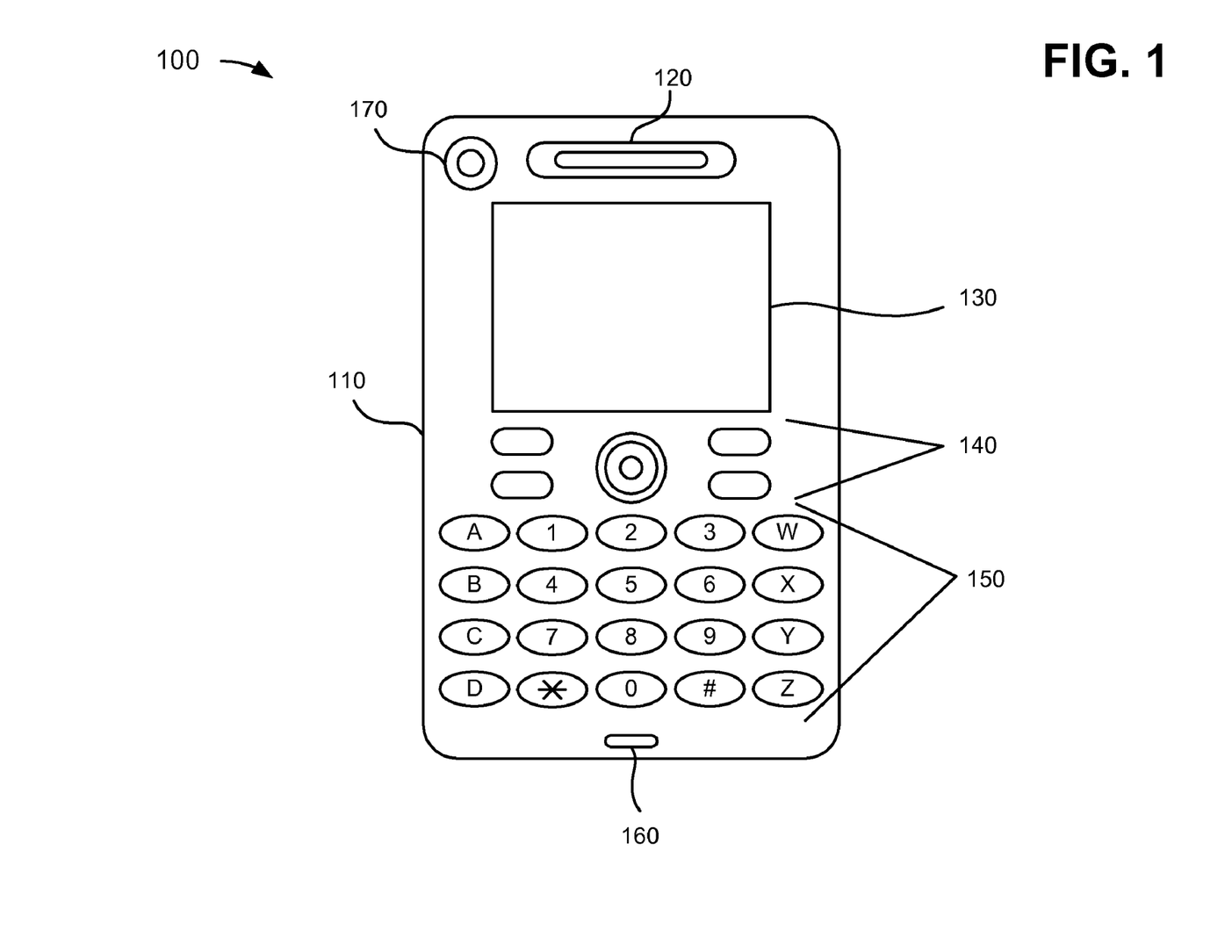
FIG. 1 is a diagram of an exemplary device in which systems and methods described herein may be implemented.

FIG. 1 is a diagram of an exemplary device 100 according to an implementation described herein. As shown in FIG. 1, device 100 may include a housing 110, a speaker 120, a display 130, control buttons 140, a keypad 150, a microphone 160, and/or a camera 170. Housing 110 may protect the components of device 100 from outside elements. Speaker 120 may provide audible information to a user of device 100. Display 130 may provide visual information to the user. For example, display 130 may provide information regarding incoming or outgoing calls, games, phone books, the current time, emails, etc. Control buttons 140 may permit the user to interact with device 100 to cause device 100 to perform one or more operations. Keypad 150 may include a standard telephone keypad and/or or may include additional keys to enable typing information into device 100. Microphone 160 may receive audible information from the user. Camera 170 may enable a user to capture and/or store video and/or images (e.g., pictures).

Although FIG. 1 shows exemplary components of device 100, in other implementations, device 100 may include fewer, different, or additional components than depicted in FIG. 1. In still other implementations, one or more components of device 100 may perform tasks performed by one or more other components of device 100.

First Exemplary Device Display

Figure 2A:
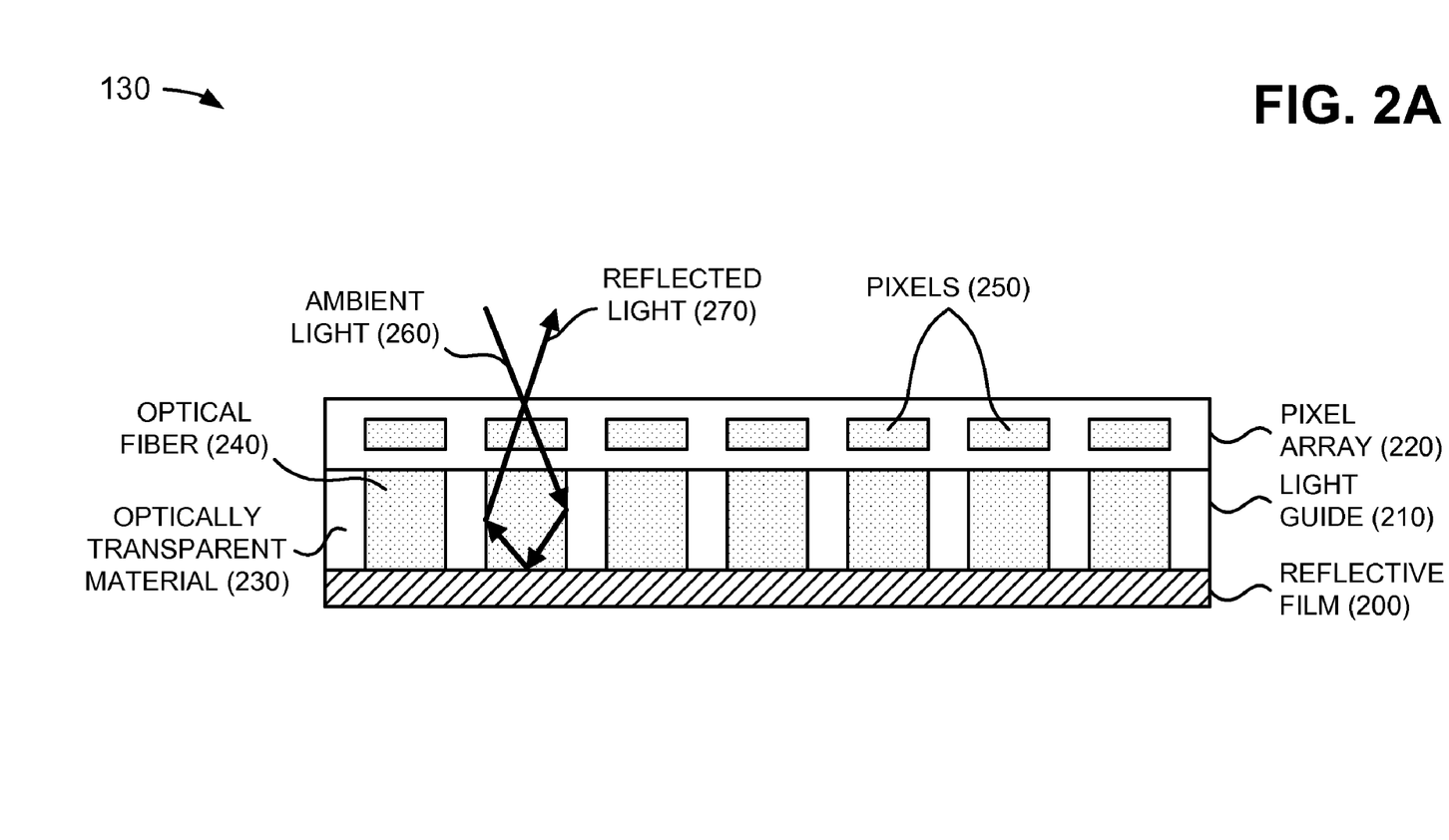
FIG. 2A is a partial side elevation view, in partial cross section, of a display of the exemplary device shown in FIG. 1.

FIG. 2A is a partial side elevation view, in partial cross section, of display 130 of device 100. As illustrated, display 130 may include a reflective film 200, an illumination device or light guide 210, and a pixel array 220. Reflective film 200, light guide 210, and pixel array 220 may have a variety of shapes and/or sizes depending upon the shapes and/or sizes of device 100 and/or display 130.

Reflective film 200 may include any material capable of reflecting ambient light. For example, reflective film 200 may include a metal-based material capable of reflecting ambient light (e.g., a sputter-coated silver on polyester film, an aluminum foil, OPTILON™ Advanced Composite Reflector (ACR), etc.), a white reflector material, a silver reflector material, a reflector material available from reflector film suppliers (e.g., Toray, Teijin DuPont, 3M, Keiwa, Tsujiden, SKC, Kimoto, etc.), etc.

Light guide 210 may include any device capable of providing illumination or lighting to pixel array 220. Display 130 may work reflectively if light guide 210 is not receiving light, and may work transmissively if light guide 210 is receiving light. In one example, light guide 210 may include a structural component used to guide light from a light source (e.g., an incandescent light bulb, one or more light-emitting diodes (LEDs), an electroluminescent panel (ELP), one or more cold cathode fluorescent lamps (CCFLs), one or more hot cathode fluorescent lamps (HCFLs), etc.). An incandescent light bulb may be used for the light source if very high brightness is desired. LEDs may be used for the light source in small, inexpensive displays, and may include colored or white light. An ELP may be used for the light source in larger displays or if even lighting is desired, and may be either colored or white. CCFLs may be used for the light source in large displays (e.g., computer monitors) and may be white in color. In another example, light guide 210 may include a diffuser to provide even lighting from an uneven light source. In still another example, light guide 210 may provide any color light (e.g., yellow, green, blue, white, etc.) or any combination of colored/non-colored light.

As further shown in FIG. 2A, in one implementation, light guide 210 may include an optically transparent material 230 with multiple optical fibers 240 embedded therein. Optically transparent material 230 may include any material capable of permitting light to pass, such as glass, quartz, sapphire, polymeric materials (e.g., polymethylmethacrylates, polyvinylcarbazoles, polybutadienes, polyethylenes, polyesters, etc.), plastics (e.g., PERSPEX™ and PYREX™, etc.), etc. Optical fibers 240 may include glass or plastic fibers designed to guide light along their lengths by total internal reflection. If made from glass, optical fibers 240 may include materials (e.g., silica, fluorozirconate, fluoroaluminate, and/or chalcogenide glasses) that have a refractive index of about, for example, 1.5. If made from plastic, optical fibers 240 may include materials, such as polymers and/or combinations of polymers and any of the glasses described above. In one implementation, the material of optical fibers 240 may have a higher index of refraction than the material of optically transparent material 230.

Pixel array 220 may include any device capable of providing visual information (e.g., text, images, video, incoming or outgoing calls, games, phone books, the current time, emails, etc.) to a user. For example, pixel array 220 may include a liquid crystal display (LCD), such as a thin film transistor (TFT) LCD display, or a high performance addressing (HPA) LCD display.

In one implementation, pixel array 220 may include any number of color and/or monochrome pixels 250 arrayed in front of a light source (e.g., light guide 210). In another implementation, pixel array 220 may include electrodes on one side of pixel array 220 that may be grouped and wired together with gate or column lines, and each group may receive its own voltage source. Pixel array 220 may further include electrodes on another side of pixel array 220 that may be grouped and wired together with row lines, and each group may receive its own voltage sink. The groups may be designated so that each pixel 250 of pixel array 220 may have a unique combination of source and sink.

In still another implementation, pixel array 220 may include a passive-matrix structure or an active-matrix structure. In a passive-matrix structure, each row or column of pixel array 220 may include a single electrical circuit, and pixels 250 may be addressable one at a time by row and column addresses. Pixels 250 may maintain their states between refreshes without the benefit of an electrical charge. In an active-matrix structure, a matrix of TFTs may be added to the polarizing and color filters, and each pixel 250 may include its own dedicated TFT that allows each gate or column line to access one pixel 250. If a row line is activated, the gate lines may be connected to a row of pixels 250 and a correct voltage may be driven onto all of the gate lines. The row line may be deactivated, and the next row line may be activated. All row lines may be activated in sequence during a refresh operation.

In a further implementation, if pixel array 220 is a color array, each pixel 250 may be divided into three cells, or subpixels, which may be colored red, green, and blue by additional filters (e.g., pigment filters, dye filters, metal oxide filters, etc.). Each subpixel may be controlled independently to yield thousands or millions of possible colors for each pixel 250. In other implementations, each pixel 250 of pixel array 220 may include more or less than three subpixels of various colors other than red, green, and blue.

As further shown in FIG. 2A, each pixel 250 of pixel array 220 may align with a corresponding optical fiber 240 so that ambient light 260 entering a specific pixel 250 may be received by the corresponding optical fiber 240. The corresponding optical fiber 240, in cooperation with reflective film 200, may reflect ambient light 260 so that reflected light 270 may exit though the specific pixel 250 through which ambient light 260 entered pixel array 220. Although FIG. 2A shows a single optical fiber 240 aligning with a single pixel 250, in other implementations, each optical fiber 240 may represent a bundle (or multiple) optical fibers. Such arrangements may minimize cross-talk of ambient light among pixels 250, and may help prevent image distortion of display 130.

Figures 2B, 2C:
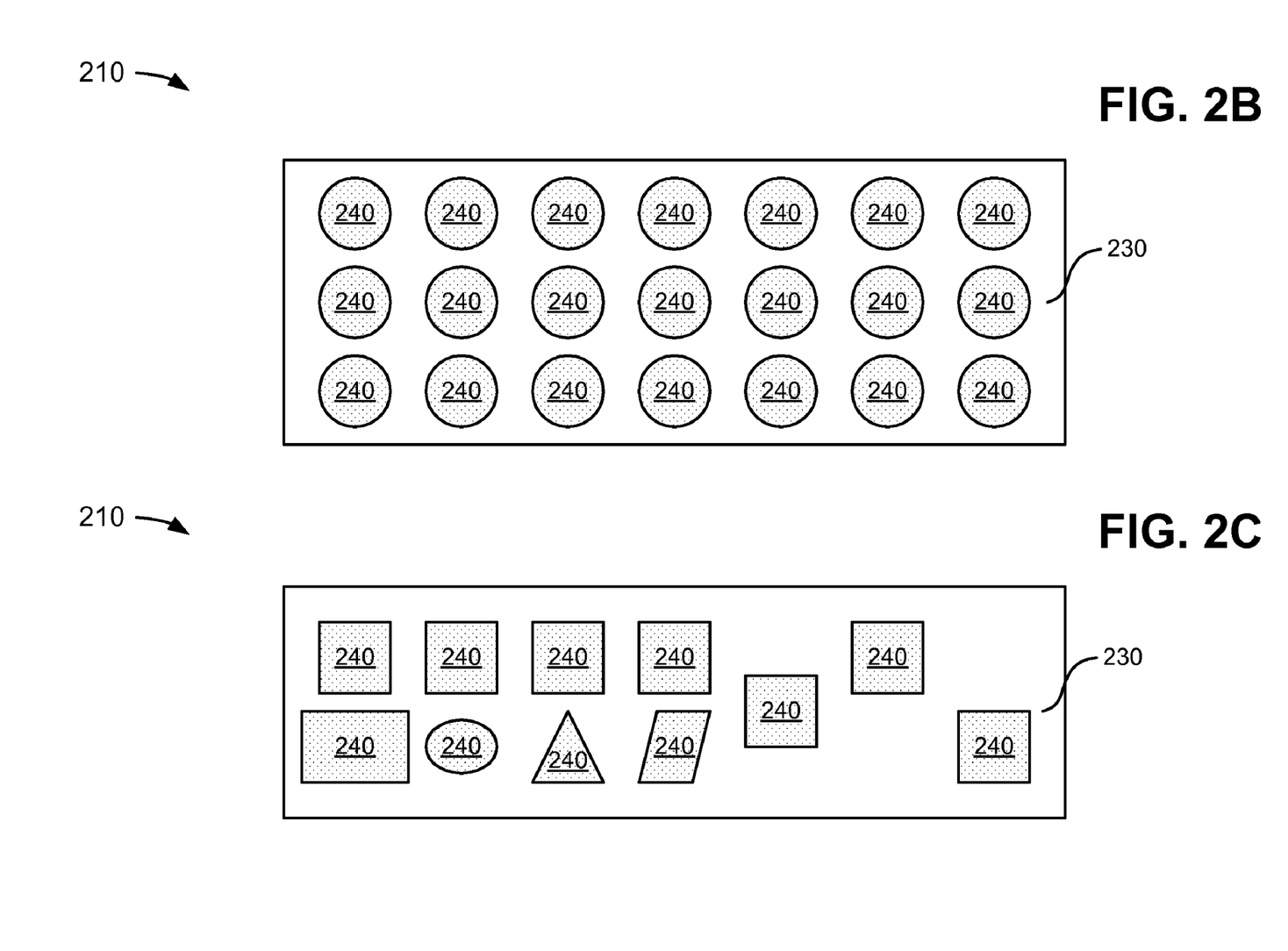
FIG. 2B shows a top partial view of a light guide of the display shown in FIGS. 1 and 2A.
FIG. 2C depicts a top partial view of another light guide of the display shown in FIGS. 1 and 2A.

FIG. 2B shows a top partial view of light guide 210 of display 130. FIG. 2C depicts a top partial view of another light guide 210 of display 130. As illustrated in FIGS. 2B and 2C, optical fibers 240 of light guide 210 may include a variety of sizes and geometric shapes, and/or may be arranged in optically transparent material 230 in a variety of ways. For example, as shown in FIG. 2B, optical fibers 240 may include circular cross sections and/or may be arranged uniformly throughout optically transparent material 230. In another example, as shown in FIG. 2C, optical fibers 240 may include one or more cross-sectional shapes (e.g., square, rectangular, elliptical, triangular, polygonal, etc.), may have one or more sizes, and/or may or may not be non-uniformly arranged throughout optically transparent material 230. In other implementations, optical fibers 240 may be sized, shaped, and/or arranged to correspond to the sizes, shapes, and/or arrangements of pixels 250 of pixel array 220. In still other implementations, optical fibers 240 may be provided through one or more portions of light guide 210. For example, if a portion of display 130 is to be transflective, optical fibers 240 may be provided through a portion of light guide that corresponds to the transflective portion of display 130.

Although FIGS. 2A-2C show exemplary components of display 130, in other implementations, display 130 may include fewer, different, or additional components (e.g., electrical components, optical components, etc.) than depicted in FIGS. 2A-2C. In still other implementations, one or more components of display 130 may perform tasks performed by one or more other components of display 130.

Second Exemplary Device Display

Figure 3A:
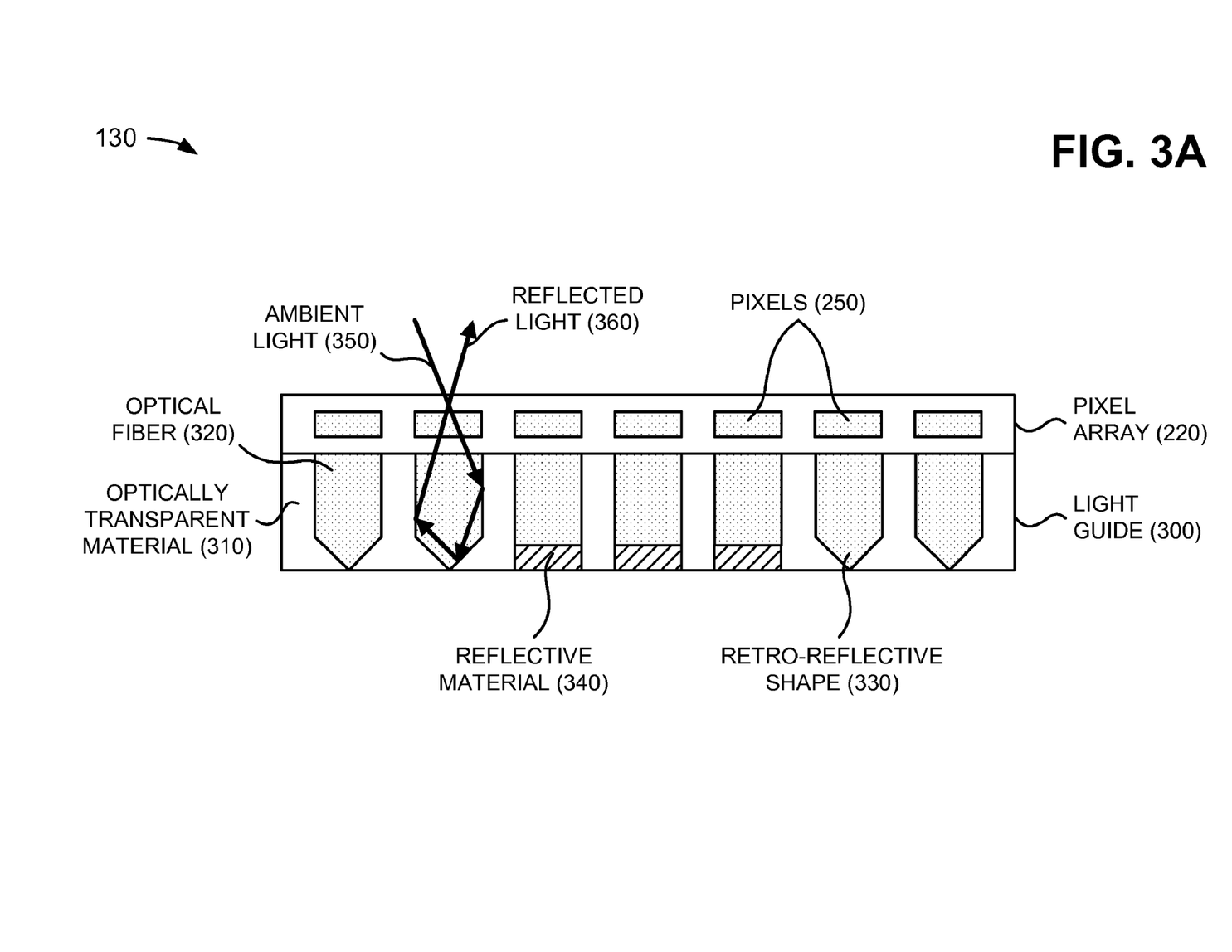
FIG. 3A is a partial side elevational view, in partial cross section, of another implementation of a display of the exemplary device shown in FIG. 1.

FIG. 3A is a partial side elevational view, in partial cross section, of another implementation of display 130 of device 100. As illustrated, display 130 may include pixel array 220 and a light guide 300, but may omit reflective film 200. Pixel array 220 and light guide 300 may have a variety of shapes and/or sizes depending upon the shapes and/or sizes of device 100 and/or display 130. Pixel array 220 may include the same features as described above in connection with FIGS. 2A-2C.

Light guide 300 may include any device capable of providing illumination or lighting to pixel array 220. Display 130 may work reflectively if light guide 300 is not receiving light, and may work transmissively if light guide 300 receives light. In one example, light guide 300 may include a structural component used to guide light from a light source (e.g., an incandescent light bulb, one or more LEDs, an ELP, one or more CCFLs, one or more hot cathode fluorescent lamps HCFLs, etc.). In another example, light guide 300 may include a diffuser to provide even lighting from an uneven light source. In still another example, light guide 300 may provide any color light (e.g., yellow, green, blue, white, etc.) or any combination of colored/non-colored light.

As further shown in FIG. 3A, in one implementation, light guide 300 may include an optically transparent material 310 with multiple optical fibers 320 embedded therein. Optically transparent material 310 may include any material capable of permitting light to pass, such as glass, quartz, sapphire, polymeric materials (e.g., polymethylmethacrylates, polyvinylcarbazoles, polybutadienes, polyethylenes, polyesters, etc.), plastics (e.g., PERSPEX™ and PYREX™, etc.), etc. Optical fibers 320 may include glass or plastic fibers designed to guide light along their lengths by total internal reflection. If made from glass, optical fibers 320 may include materials (e.g., silica, fluorozirconate, fluoroaluminate, and/or chalcogenide glasses) that have a refractive index of about, for example, 1.5. If made from plastic, optical fibers 320 may include materials, such as polymers and/or combinations of polymers and any of the glasses described above. In one implementation, the material of optical fibers 320 may have a higher index of refraction than the material of optically transparent material 310.

In one implementation, as shown in FIG. 3A, the ends of one or more optical fibers 320 may be formed into geometric shapes that result in retro-reflector behavior (i.e., retro-reflective geometric shapes 330). Retro-reflective geometric shapes 330 may reflect ambient light 350 in such a manner that reflected light 360 and ambient light 350 may pass through the same pixel 250. Retro-reflective geometric shapes 330 may include a variety of shapes and/or sizes, as described below in connection with FIGS. 3B and 3C.

In another implementation, as shown in FIG. 3A, the ends of one or more optical fibers 320 may include a reflective material 340 (e.g., such as any of the materials used to form reflective film 200, as described above). Reflective material 340 may reflect ambient light 350 in such a manner that reflected light 360 and ambient light 350 may pass through the same pixel 250. Reflective material 340 may include a variety of shapes and/or sizes, as described below in connection with FIGS. 3D and 3E.

As further shown in FIG. 3A, each pixel 250 of pixel array 220 may align with a corresponding optical fiber 320 so that ambient light 350 entering a specific pixel 250 may be received by the corresponding optical fiber 320. The corresponding optical fiber 320, via retro-reflective geometric shape 330 and/or reflective material 340, may reflect ambient light 350 so that reflected light 360 may exit though the specific pixel 250 through which ambient light 350 entered pixel array 220. Although FIG. 3A shows a single optical fiber 320 aligning with a single pixel 250, in other implementations, each optical fiber 320 may represent a bundle (or multiple) optical fibers. Such arrangements may minimize crosstalk of ambient light among pixels 250, and may help prevent image distortion of display 130.

Figure 3B:
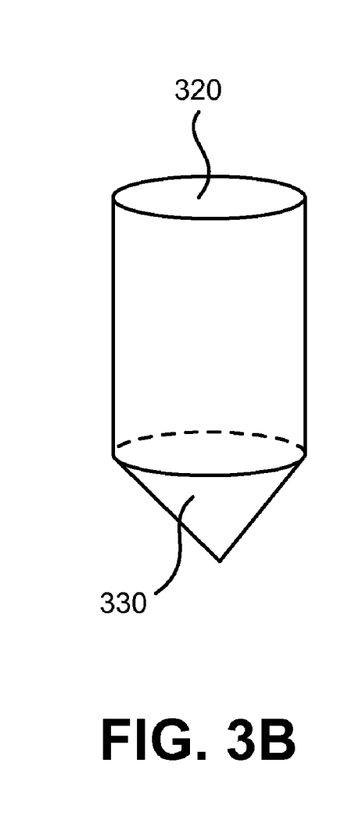
FIGS. 3B-3E depict exemplary implementations of optical fibers of a light guide shown in the display of FIG. 3A.
Figure 3C:
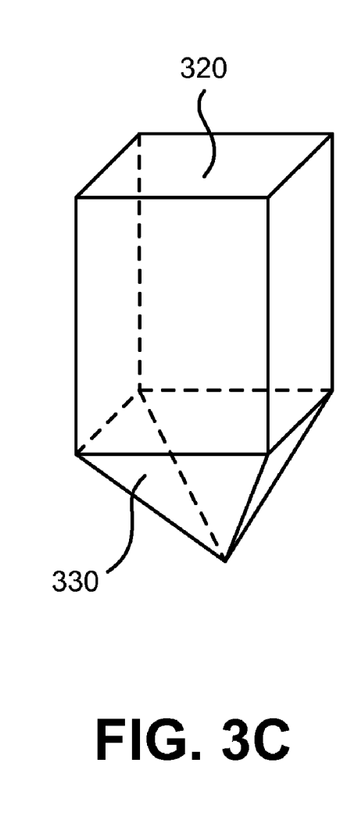
Figure 3D:
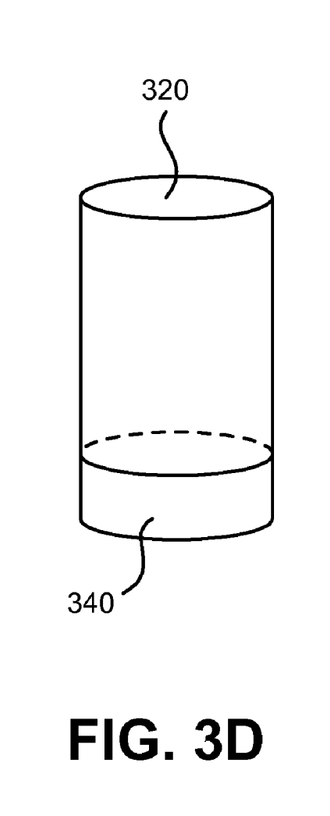
Figure 3E:
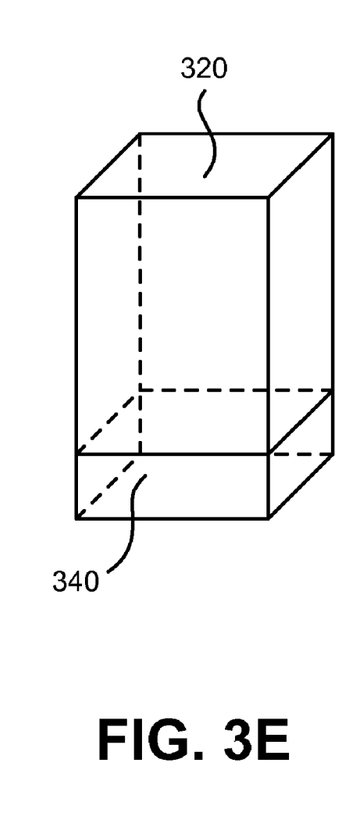

FIGS. 3B-3E depict exemplary implementations of optical fibers 320 of light guide 300. As shown in FIGS. 3B-3E, optical fibers 320 may include circular, square, rectangular, elliptical, triangular, polygonal, etc. cross sections, and may have one or more sizes. As shown in FIGS. 3B and 3C, retro-reflective geometric shape 330 may include any geometric shape that results in retro-reflective behavior, such as conic (FIG. 3B) or prismatic (FIG. 3C) shapes. As shown in FIGS. 3D and 3E, reflective material 340 may include any shapes that correspond with the shapes of optical fibers 320, such as circular (FIG. 3D) or square (FIG. 3E). In one example, reflective material 340 may include a reflective coating or film provided on ends of optical fibers 320 (e.g., on ends away from pixel array 220).

Although FIGS. 3A-3E show exemplary components of display 130, in other implementations, display 130 may include fewer, different, or additional components (e.g., electrical components, optical components, etc.) than depicted in FIGS. 3A-3E. In still other implementations, one or more components of display 130 may perform tasks performed by one or more other components of display 130.

Third Exemplary Device Display

Figure 4A:
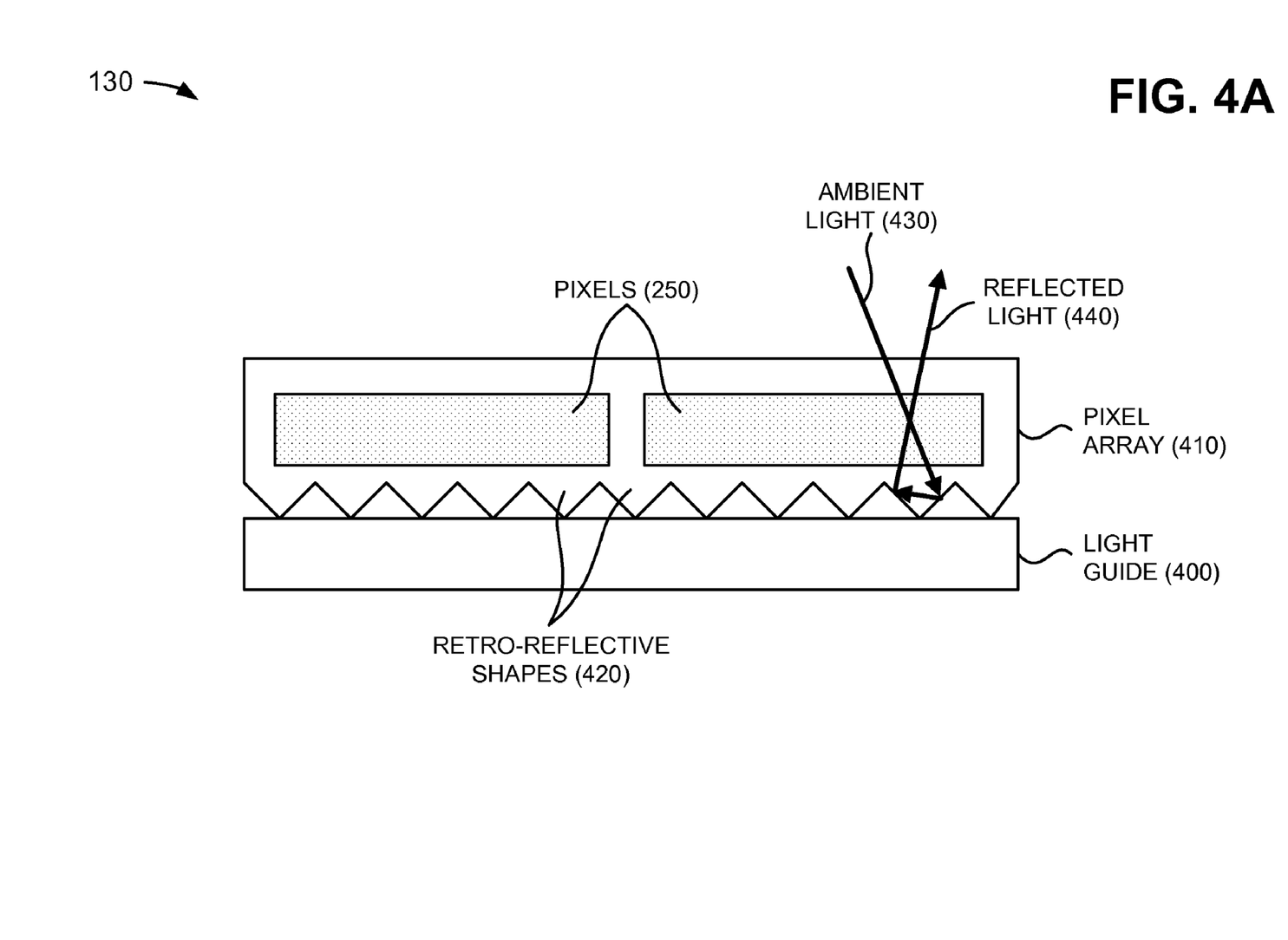
FIG. 4A is a partial side elevational view, in partial cross section, of still another implementation of a display of the exemplary device shown in FIG. 1.

FIG. 4A is a partial side elevational view, in partial cross section, of still another implementation of display 130 of device 100. As illustrated, display 130 may include a light guide 400 and a pixel array 410, but may omit reflective film 200. Light guide 400 and pixel array 410 may have a variety of shapes and/or sizes depending upon the shapes and/or sizes of device 100 and/or display 130.

Light guide 400 may include any device capable of providing illumination or lighting to pixel array 410. Display 130 may work reflectively if light guide 400 is not receiving light, and may work transmissively if light guide 400 receives light. In one example, light guide 400 may include a structural component used to guide light from a light source (e.g., an incandescent light bulb, one or more LEDs, an ELP, one or more CCFLs, one or more hot cathode fluorescent lamps HCFLs, etc.). In another example, light guide 400 may include a diffuser to provide even lighting from an uneven light source. In still another example, light guide 400 may provide any color light (e.g., yellow, green, blue, white, etc.) or any combination of colored/non-colored light.

Light guide 400 may include any optically transparent material (i.e., any material capable of permitting light to pass), such as glass, quartz, sapphire, polymeric materials (e.g., polymethylmethacrylates, polyvinylcarbazoles, polybutadienes, polyethylenes, polyesters, etc.), plastics (e.g., PERSPEX™ and PYREX™, etc.), etc.

Pixel array 410 may include the same features described above in connection with FIGS. 2A-2C for pixel array 220. However, one side of pixel array 410 (e.g., the side facing light guide 400) may include one or more retro-reflective shapes 420 that align with corresponding pixels 250. Retro-reflective shapes 420 may reflect ambient light 430 in such a manner that reflected light 440 and ambient light 430 may pass through the same pixel 250. Retro-reflective shapes 420 may include a variety of shapes and/or sizes, as described below in connection with FIGS. 4B and 4C.

As further shown in FIG. 4A, each pixel 250 of pixel array 410 may align with corresponding one or more retro-reflective shapes 420 so that ambient light 430 entering a specific pixel 250 may be received by corresponding retro-reflective shapes 420. The corresponding retro-reflective shapes 420 may reflect ambient light 430 so that reflected light 440 may exit though the specific pixel 250 through which ambient light 430 entered pixel array 410. Although FIG. 4A shows multiple retro-reflective shapes 420 aligning with a single pixel 250, in other implementations, fewer or additional retro-reflective shapes 420 than depicted in FIG. 4A may align with a single pixel 250. Such arrangements may minimize crosstalk of ambient light among pixels 250, and may help prevent image distortion of display 130.

Figure 4B:
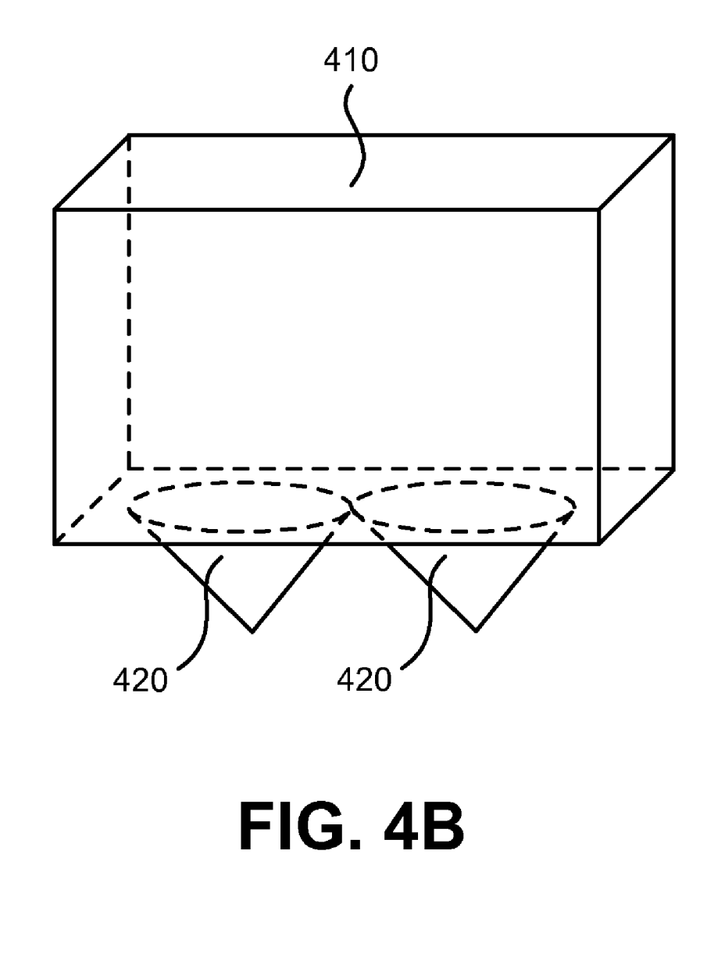
FIGS. 4B and 4C depict exemplary implementations of pixel arrays of the display shown in FIG. 4A.
Figure 4C:
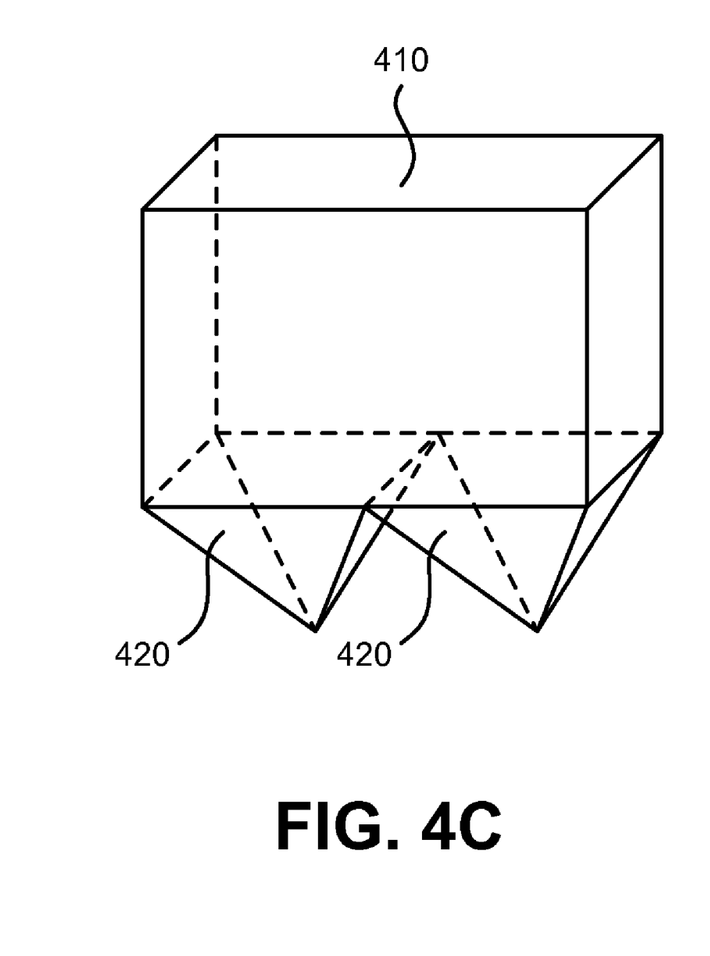

FIGS. 4B and 4C depict exemplary implementations of pixel array 410. As illustrated, retro-reflective shapes 420 may include any geometric shape that results in retro-reflective behavior, such as conic (FIG. 4B), prismatic (FIG. 4C), and/or a combination of conic and prismatic shapes. In other implementations, retro-reflective shapes 420 may include shapes different than the shapes depicted in FIGS. 4B and 4C.

Although FIGS. 4A-4C show exemplary components of display 130, in other implementations, display 130 may include fewer, different, or additional components (e.g., electrical components, optical components, etc.) than depicted in FIGS. 4A-4C. In still other implementations, one or more components of display 130 may perform tasks performed by one or more other components of display 130.

Exemplary Pixel of First, Second, and Third Exemplary Device Displays

Figure 5:
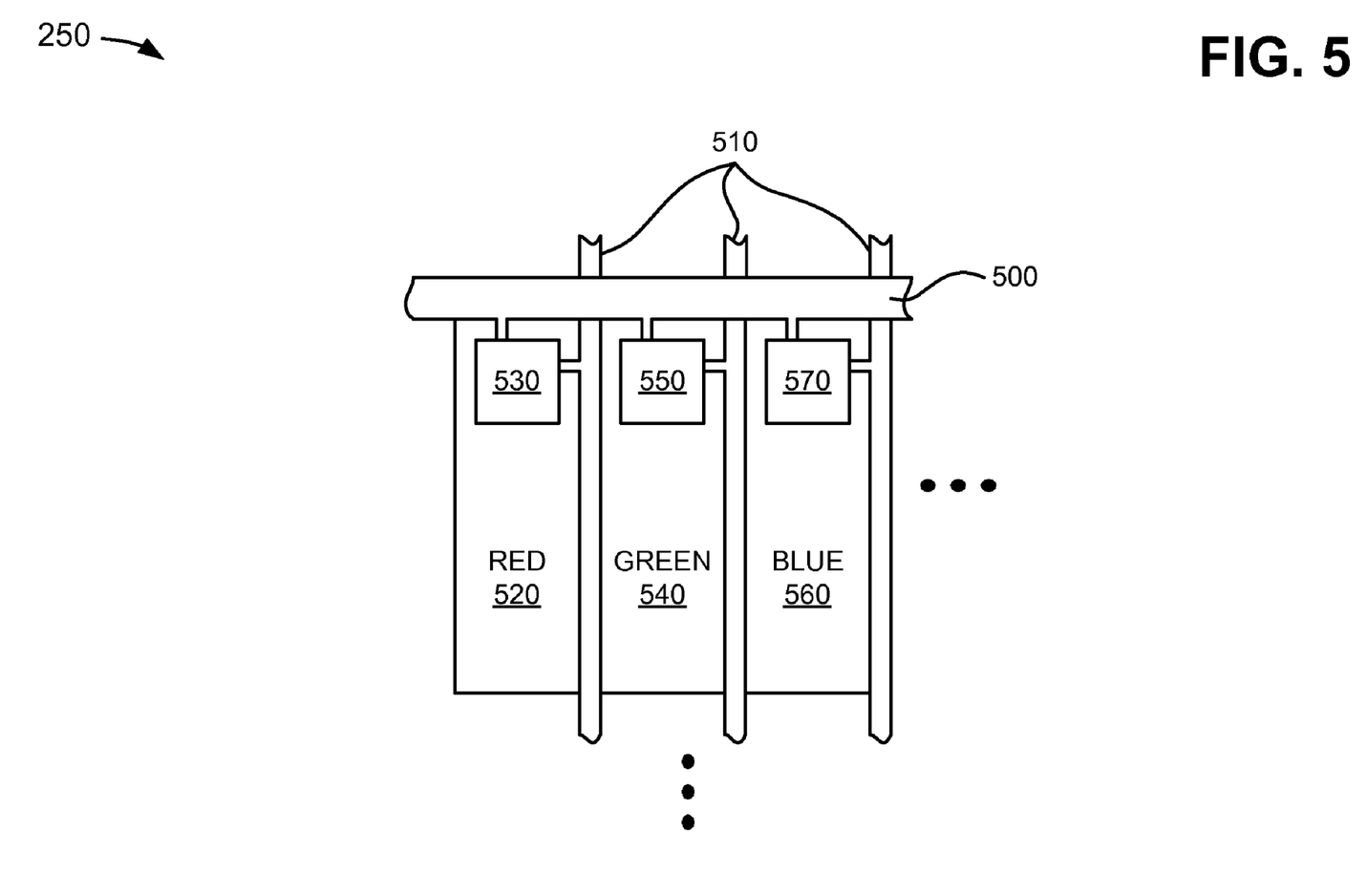
FIG. 5 is a partial side elevation view of an exemplary pixel of the pixel arrays shown in FIGS. 2A, 3A, and 4A-4C.

FIG. 5 is a partial side elevation view of an exemplary pixel 250 of pixel arrays 220 and 410. Although FIG. 5 shows a color pixel, in other implementations, pixel arrays 220 and 410 may include monochrome pixels. As shown, pixel 250 may include a red subpixel 520, a green subpixel 540, and a blue subpixel 560, which may be associated with a row line 500 and gate lines 510.

As further shown in FIG. 5, red subpixel 520 may be associated with a thin film transistor (TFT) 530, and may use a color filter (e.g., red) to create color. Red subpixel 520 may include any material that may be illuminated from the back (e.g., with light guides 210, 300, and/or 400), and is viewed from the opposite side (i.e., the front). TFT 530 may be electrically coupled to row line 500 and to a corresponding one of gate lines 510. TFT 530 may permit row line 500 and/or the corresponding one of gate lines 510 to access red subpixel 520.

Green subpixel 540 may be associated with a TFT 550, and may use a color filter (e.g., green) to create color. Green subpixel 540 may include any material that may be illuminated from the back (e.g., with light guides 210, 300, and/or 400), and is viewed from the opposite side (i.e., the front). TFT 550 may be electrically coupled to row line 500 and to a corresponding one of gate lines 510. TFT 550 may permit row line 500 and/or the corresponding one of gate lines 510 to access green subpixel 540.

As further shown in FIG. 5, blue subpixel 560 may be associated with a TFT 570, and may use a color filter (e.g., blue) to create color. Blue subpixel 560 may include any material that may be illuminated from the back (e.g., with light guides 210, 300, and/or 400), and is viewed from the opposite side (i.e., the front). TFT 570 may be electrically coupled to row line 500 and to a corresponding one of gate lines 510. TFT 570 may permit row line 500 and/or the corresponding one of gate lines 510 to access blue subpixel 570.

Although FIG. 5 shows exemplary components of pixel 250, in other implementations, pixel 250 may include fewer, different, or additional components (e.g., electrical components, optical components, etc.) than depicted in FIG. 5. In still other implementations, one or more components of pixel 250 may perform tasks performed by one or more other components of pixel 250.

EXEMPLARY PROCESSES

Figure 6:
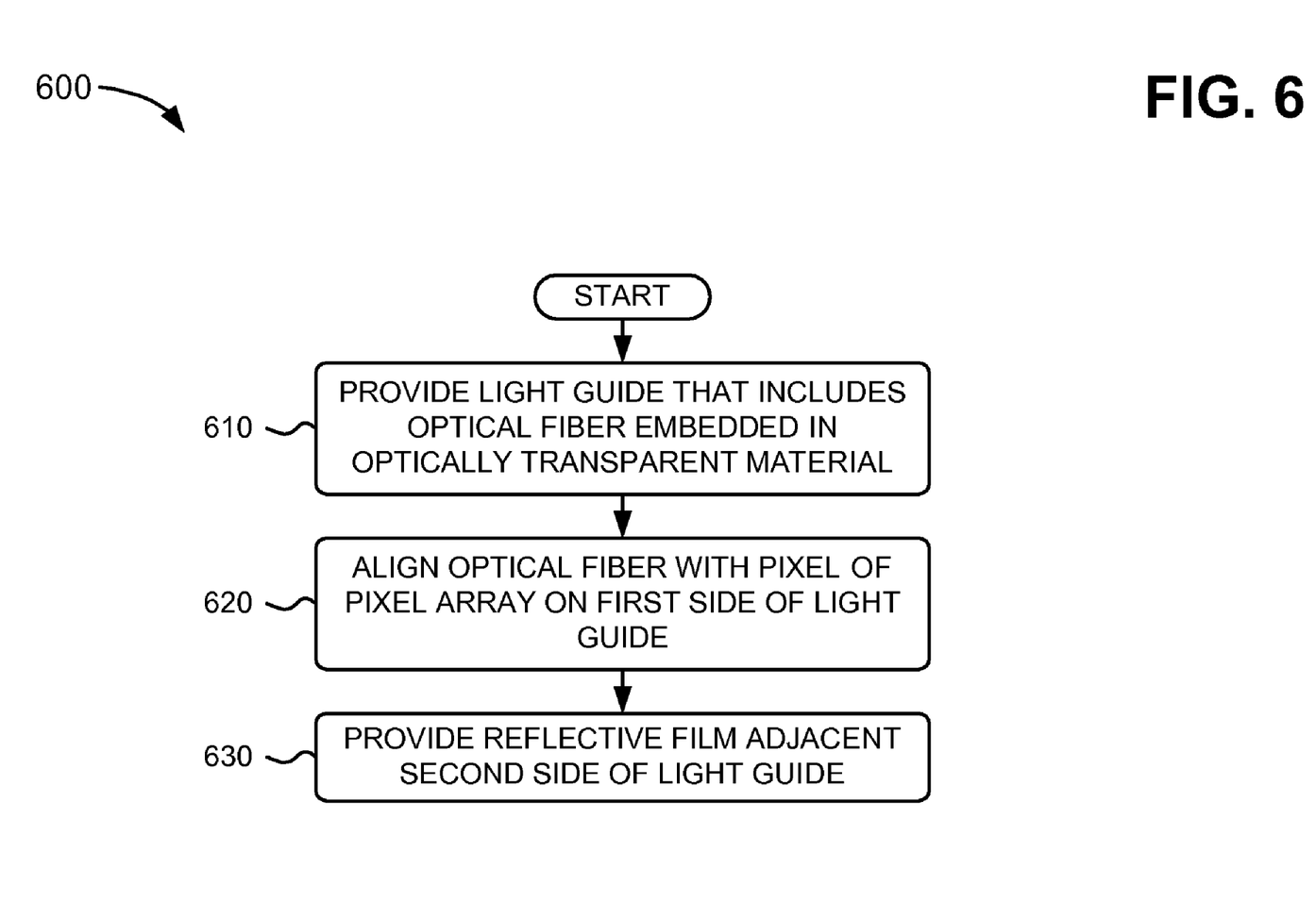
FIGS. 6-9 are flowcharts of exemplary processes according to exemplary implementations described herein.

FIG. 6 is a flowchart of an exemplary process 600 for creating display 130 depicted in FIGS. 2A-2C. As shown, process 600 may begin by providing a light guide that includes an optical fiber embedded in an optically transparent material (block 610). For example, in one implementation, described above in connection with FIGS. 2A-2C, display 130 may include light guide 210 (e.g., any device capable of providing illumination or lighting). Light guide 210 may include optically transparent material 230 with multiple optical fibers 240 embedded therein. Optically transparent material 230 may include any material capable of permitting light to pass, and optical fibers 240 may include glass or plastic fibers designed to guide light along their lengths by total internal reflection. In one example, the material of optical fibers 240 may have a higher index of refraction than the material of optically transparent material 230.

Process 600 may also include aligning the optical fiber of the light guide with a pixel of a pixel array on a first side of the light guide (block 620). For example, in one implementation, described above in connection with FIGS. 2A-2C, display 130 may include pixel array 220 facing a first side of light guide 210. Pixel array 220 may include multiple pixels 250. Each pixel 250 of pixel array 220 may align with a corresponding optical fiber 240 so that ambient light 260 entering a specific pixel 250 may be received by the corresponding optical fiber 240. The corresponding optical fiber 240, in cooperation with reflective film 200, may reflect ambient light 260 so that reflected light 270 may exit though the specific pixel 250 through which ambient light 260 entered pixel array 220.

As further shown in FIG. 6, process 600 may include providing a reflective film adjacent to a second side of the light guide (block 630). For example, in one implementation, described above in connection with FIGS. 2A-2C, display 130 may include reflective film 200 facing a second side of light guide 210. Reflective film 200 may reflect ambient light 260 entering display 130, via pixel array 220 and optical fibers 240.

Figure 7:
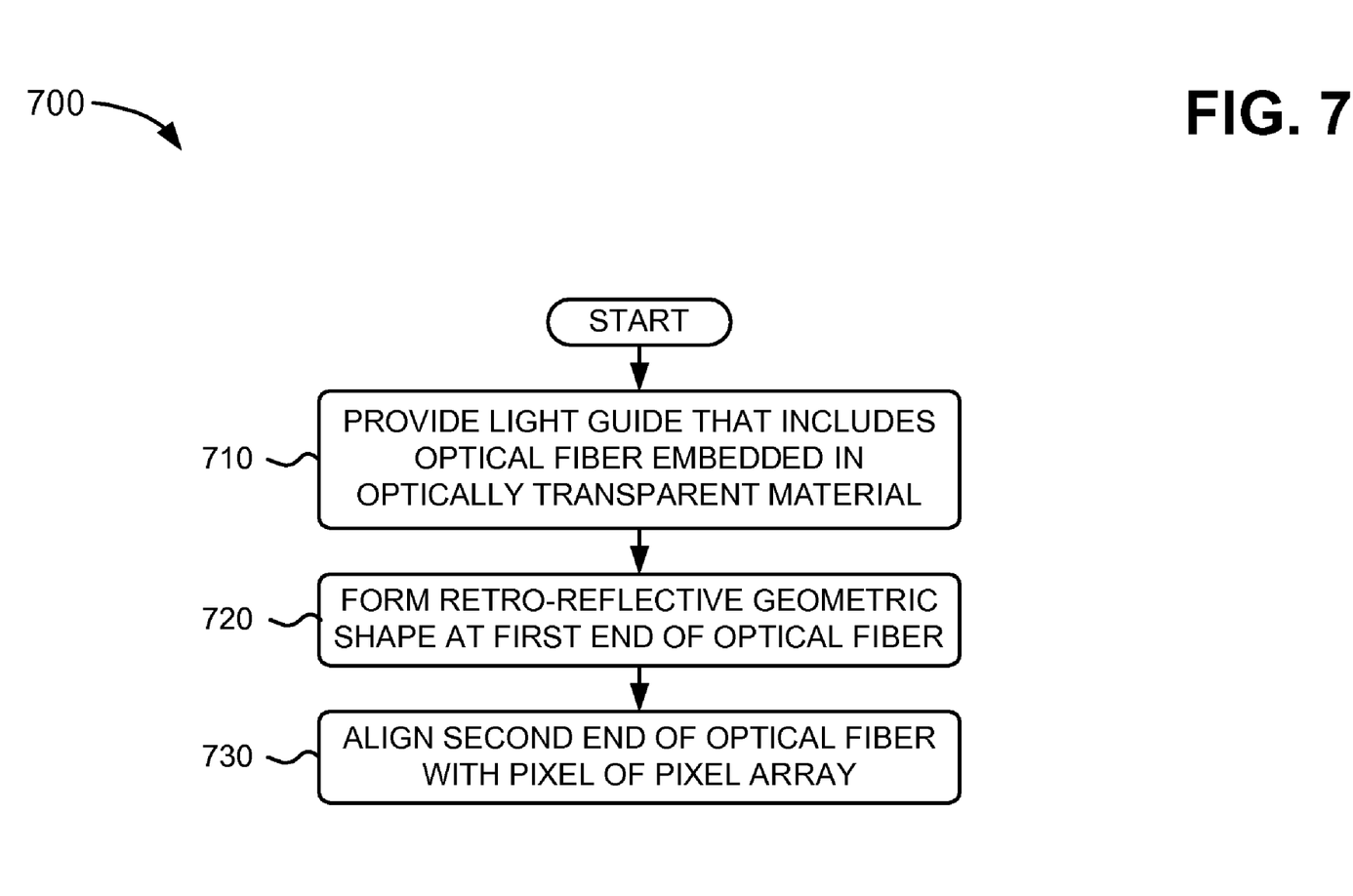

FIG. 7 is a flowchart of an exemplary process 700 for creating display 130 depicted in FIGS. 3A-3C. As shown, process 700 may begin by providing a light guide that includes an optical fiber embedded in an optically transparent material (block 710). For example, in one implementation described above in connection with FIGS. 3A-3C, display 130 may include light guide 300 (e.g., any device capable of providing illumination or lighting). Light guide 300 may include optically transparent material 310 with multiple optical fibers 320 embedded therein. Optically transparent material 310 may include any material capable of permitting light to pass, and optical fibers 320 may include glass or plastic fibers designed to guide light along their lengths by total internal reflection. In one example, the material of optical fibers 320 may have a higher index of refraction than the material of optically transparent material 310.

Process 700 may include forming a retro-reflective geometric shape at a first end of the optical fiber (block 720). For example, in one implementation described above in connection with FIGS. 3A-3C, the ends of one or more optical fibers 320 may be formed into geometric shapes that result in retro-reflector behavior (i.e., retro-reflective geometric shapes 330). Retro-reflective geometric shapes 330 may reflect ambient light 350 in such a manner that reflected light 360 and ambient light 350 may pass through the same pixel 250. Retro-reflective geometric shapes 330 may include any geometric shapes that result in retro-reflective behavior, such as conic (FIG. 3B) or prismatic (FIG. 3C) shapes.

As further shown in FIG. 7, process 700 may include aligning a second end of the optical fiber with a pixel of a pixel array (block 730). For example, in one implementation described above in connection with FIG. 3A, display 130 may include pixel array 220 that may include multiple pixels 250. Each pixel 250 of pixel array 220 may align with a corresponding optical fiber 320 so that ambient light 350 entering a specific pixel 250 may be received by the corresponding optical fiber 320. The corresponding optical fiber 320, via retro-reflective geometric shape 330, may reflect ambient light 350 so that reflected light 360 may exit though the specific pixel 250 through which ambient light 350 entered pixel array 220.

Figure 8:
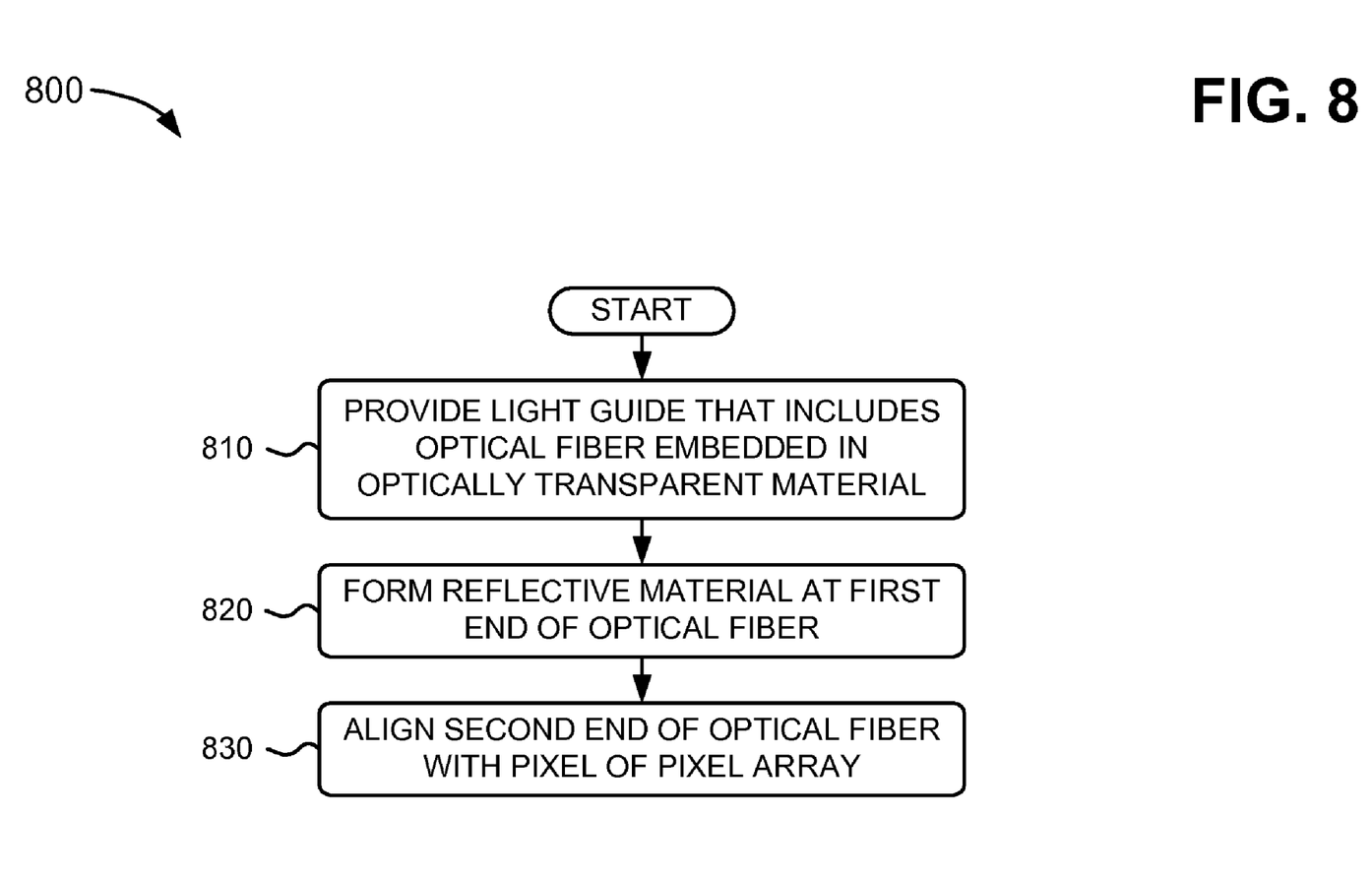

FIG. 8 is a flowchart of an exemplary process 800 for creating display 130 depicted in FIGS. 3A, 3D, and 3E. As shown, process 800 may begin by providing a light guide that includes an optical fiber embedded in an optically transparent material (block 810). For example, in one implementation described above in connection with FIGS. 3A, 3D, and 3E, display 130 may include light guide 300 (e.g., any device capable of providing illumination or lighting). Light guide 300 may include optically transparent material 310 with multiple optical fibers 320 embedded therein. Optically transparent material 310 may include any material capable of permitting light to pass, and optical fibers 320 may include glass or plastic fibers designed to guide light along their lengths by total internal reflection. In one example, the material of optical fibers 320 may have a higher index of refraction than the material of optically transparent material 310.

Process 800 may include forming a reflective material at a first end of the optical fiber (block 820). For example, in one implementation described above in connection with FIGS. 3A, 3D, and 3E, the ends of one or more optical fibers 320 may include reflective material 340 (e.g., such as any of the materials used to form reflective film 200, as described above). Reflective material 340 may reflect ambient light 350 in such a manner that reflected light 360 and ambient light 350 may pass through the same pixel 250. Reflective material 340 may include any shapes that correspond with the shapes of optical fibers 320, such as circular (FIG. 3D) or square (FIG. 3E). In one example, reflective material 340 may include a reflective coating or film provided on ends of optical fibers 320 (e.g., on ends away from pixel array 220).

As further shown in FIG. 8, process 800 may include aligning a second end of the optical fiber with a pixel of a pixel array (block 830). For example, in one implementation described above in connection with FIG. 3A, display 130 may include pixel array 220 that may include multiple pixels 250. Each pixel 250 of pixel array 220 may align with a corresponding optical fiber 320 so that ambient light 350 entering a specific pixel 250 may be received by the corresponding optical fiber 320. The corresponding optical fiber 320, via reflective material 340, may reflect ambient light 350 so that reflected light 360 may exit though the specific pixel 250 through which ambient light 350 entered pixel array 220.

Figure 9:
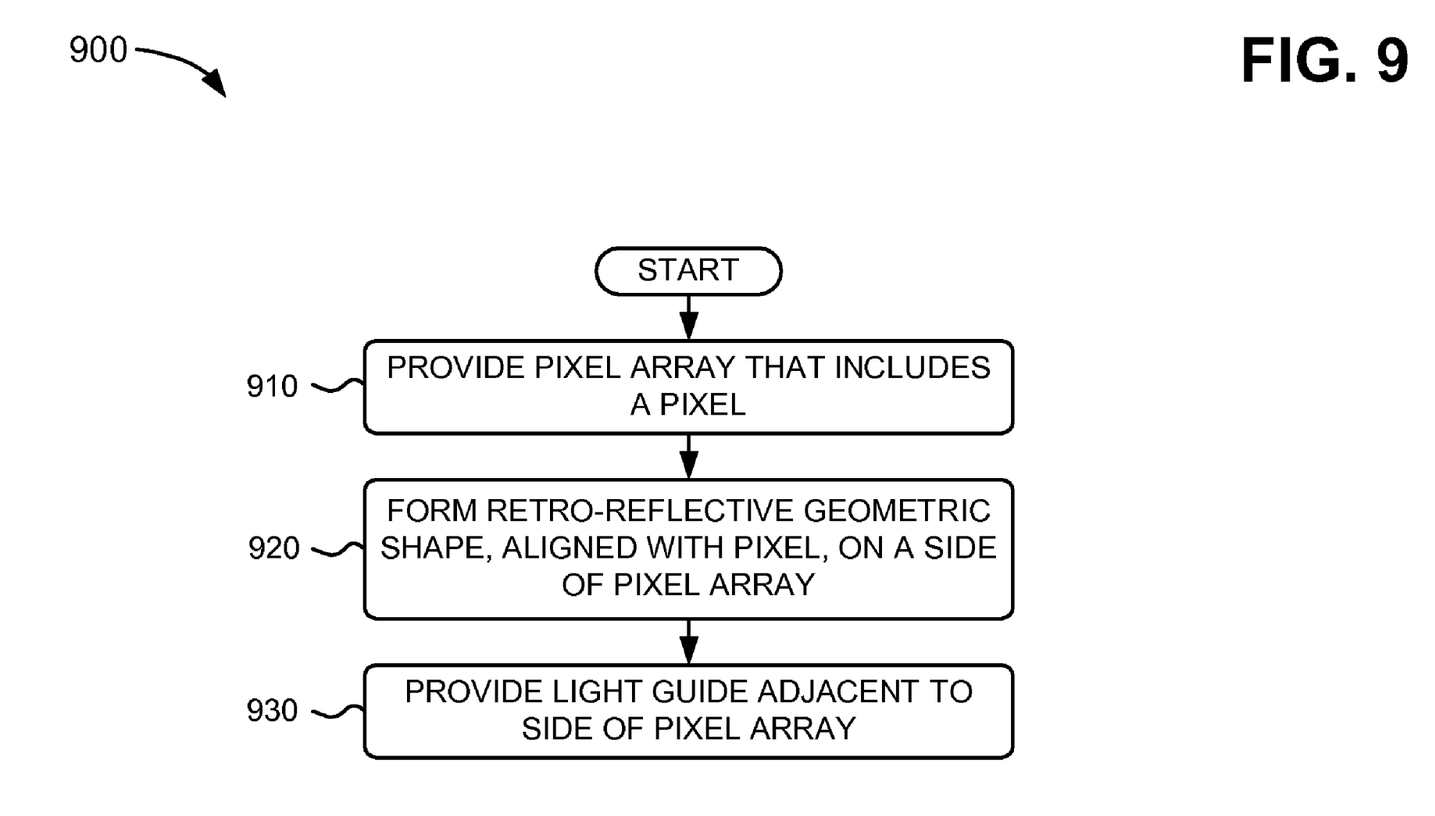

FIG. 9 is a flowchart of an exemplary process 900 for creating display 130 depicted in FIGS. 4A-4C. As shown, process 900 may begin by providing a pixel array that includes a pixel (block 910). For example, in one implementation described above in connection with FIGS. 4A-4C, display 130 may include pixel array 410 that may include multiple pixels 250.

Process 900 may include forming a retro-reflective geometric shape, aligned with the pixel, on a side of the pixel array (block 920). For example, in one implementation described above in connection with FIGS. 4A-4C, one side of pixel array 410 (e.g., the side facing light guide 400) may include one or more retro-reflective shapes 420 that align with corresponding pixels 250. Retro-reflective shapes 420 may reflect ambient light 430 in such a manner that reflected light 440 and ambient light 430 may pass through the same pixel 250. Retro-reflective shapes 420 may include any geometric shape that results in retro-reflective behavior, such as conic (FIG. 4B), prismatic (FIG. 4C), and/or a combination of conic and prismatic shapes. Each pixel 250 of pixel array 410 may align with corresponding one or more retro-reflective shapes 420 so that ambient light 430 entering a specific pixel 250 may be received by a corresponding retro-reflective shape 420. The corresponding retro-reflective shape 420 may reflect ambient light 430 so that reflected light 440 may exit though the specific pixel 250 through which ambient light 430 entered pixel array 410.

As further shown in FIG. 9, process 900 may include providing a light guide adjacent to the side of the pixel array (block 930). For example, in one implementation described above in connection with FIG. 4A, display 130 may include light guide 400 that may include any optically transparent material (i.e., any material capable of permitting light to pass), such as glass, quartz, sapphire, polymeric materials, plastics, etc. Light guide 400 may be provided adjacent to a side of pixel array 410.

CONCLUSION

Implementations described herein may relate to systems and methods for providing a low loss transflective device display. For example, in one implementation, a device display may include a light guide, a reflective material provided on one side of the light guide, and a pixel array that includes multiple pixels. The light guide of a device display may include optical fibers provided in an optically transparent material. Each optical fiber may optically communicate with a corresponding pixel of the pixel array. In another implementation, the reflective material may be omitted, and the optical fibers of the light guide may include reflective portions and/or retro-reflective geometric shapes on one end. In still another implementation, the reflecting material may be omitted, and the light guide may include an optically transmissive material. A surface of the pixel array facing the light guide may include retro-reflective geometric shapes. Such arrangements may help ensure that ambient light is provided to and reflected through the same pixel of the device's pixel array, which may help prevent mixing of image information from different pixels and distorting of the display image.

The foregoing description provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 6-9, the order of the acts may be modified in other implementations. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

Embodiments, as described above, may be implemented in many different forms of software, firmware, and hardware in the implementations illustrated in the figures. The actual software code or specialized control hardware used to implement aspects described herein is not limiting of the invention. Thus, the operation and behavior of the aspects were described without reference to the specific software code—it being understood that software and control hardware to implement the aspects may be designed based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device display, comprising:
    a pixel array that includes one or more transflective pixels and one or more non-transflective pixels that differ from the one or more transflective pixels, where the one or more transflective pixels include a plurality of sizes, a plurality shapes, and an arrangement;

a light guide that includes:
   an optically transparent material, and
   a plurality of optical fibers embedded in the optically transparent material, where the plurality of optical fibers are substantially parallel, each of the plurality of optical fibers includes a first end and a second end, and each of the plurality of optical fibers is to guide light along a length by total internal reflection, the one or more transflective pixels being aligned with the first ends of the plurality of optical fibers, and the one or more non-transflective pixels not being aligned with the first ends of the plurality of optical fibers, where each of the plurality of optical fibers is sized, shaped, and arranged to correspond, respectively, to one of the plurality of sizes, one of the plurality of shapes, and the arrangement of an associated one of the one or more transflective of pixels; and a reflective mechanism provided at and in contact with the second ends of the plurality of optical fibers, where the reflective mechanism is to reflect light, received by one of the plurality of pixels, back to the one of the one or more transflective pixels via a corresponding one of the plurality of optical fibers.

2. The device display of claim 1, where the reflective mechanism comprises a reflective film provided on a side of the light guide opposing a side of the light guide facing the pixel array.

3. The device display of claim 2, where the reflective film comprises at least one of a metal-based material capable of reflecting light, a white reflector material, or a silver reflector material.

4. The device display of claim 1, where an index of refraction of each of the plurality of the optical fibers is higher than an index of refraction of the optically transparent material.

5. The device display of claim 1, where the optically transparent material comprises at least one of glass, quartz, sapphire, polymeric, or plastic materials.

6. The device display of claim 1, where the plurality of optical fibers comprises at least one of glass or plastic materials.

7. The device display of claim 1, where each of the plurality of optical fibers comprise at least one of a circular, a square, a rectangular, an elliptical, a triangular, or a polygonal cross section.

8. The device display of claim 1, where the pixel array comprises at least one of a monochrome or a color pixel array.

9. The device display of claim 1, where the pixel array is provided in a liquid crystal display (LCD).

10. The device display of claim 1, where each of the plurality of pixels of the pixel array comprises:
   a first thin film transistor (TFT) associated with a first subpixel;
   a second TFT associated with a second subpixel; and
   a third TFT associated with a third subpixel.

* * * * *